May 9, 1933.   H. E. TINSLEY   1,908,082
REVOLVING RAKE AND PICK-UP MACHINE
Filed April 23, 1930   3 Sheets-Sheet 1
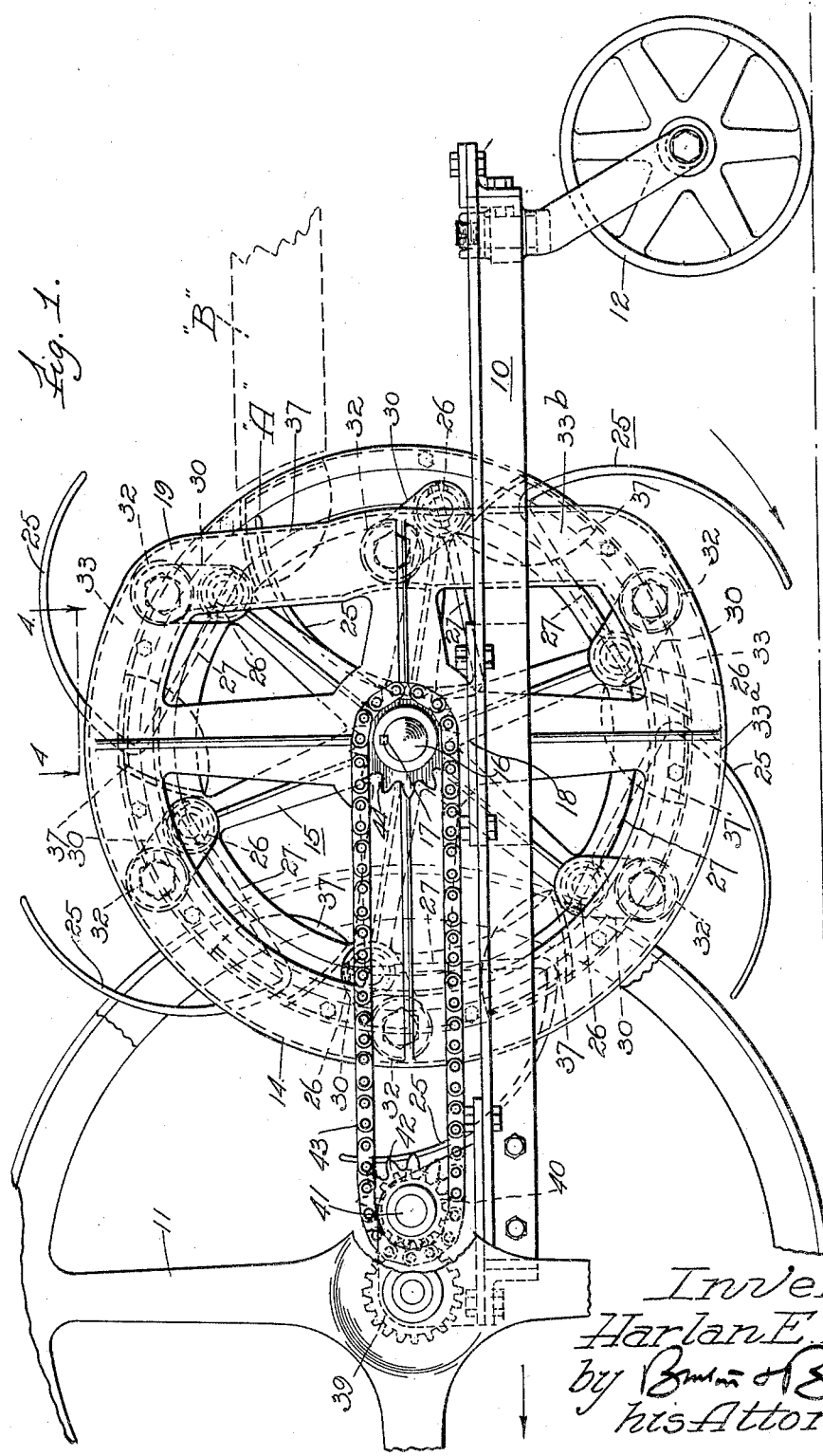

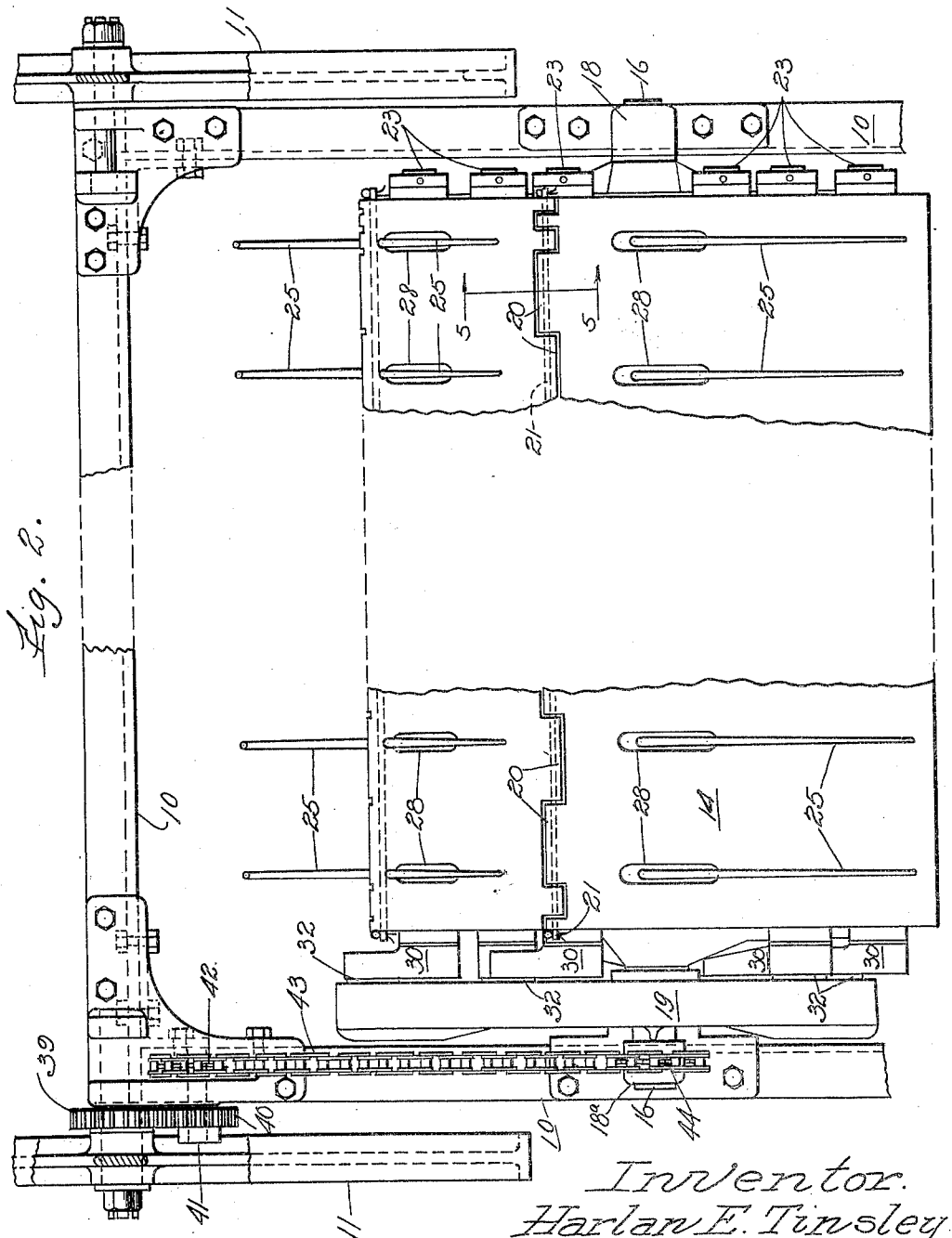

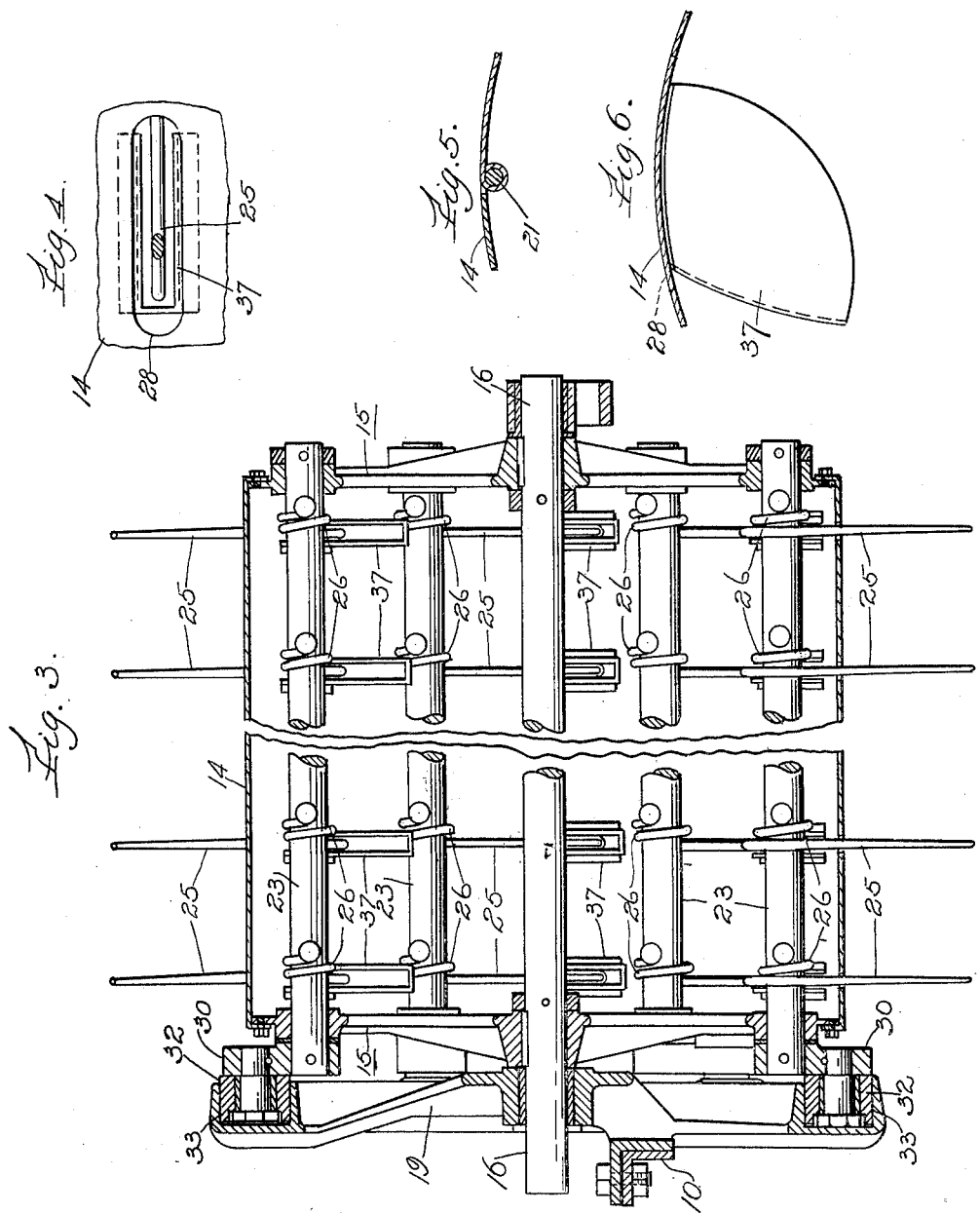

Patented May 9, 1933

1,908,082

UNITED STATES PATENT OFFICE

HARLAN E. TINSLEY, OF CHICAGO, ILLINOIS

REVOLVING RAKE AND PICK-UP MACHINE

Application filed April 23, 1930. Serial No. 446,685.

This invention relates to implements of the harvesting class, and more particularly to a rake or pick-up machine, adapted for gathering, picking up and discharging material such as straw and the like. An object of the invention is to provide an improved implement of the character mentioned employing a revolving drum provided with a series of movable tines carried by the drum and adapted to be wholly retracted within it during a certain portion of each revolution of the drum, for positively stripping the material off the tines. Another object is to provide an improved construction wherein the tines are pivotally mounted inside of the drum and are each provided with curved material engaging portions radially offset from and concentric with their pivots and adapted to be swung about their pivot axes in a true curvilinear path into and out of operative position. It consists in certain features and elements of construction, herein shown and described, and as indicated by the claims.

In the drawings:

Figure 1 is a view in elevation of a raking machine embodying the present invention.

Figure 2 is a top plan view of the same.

Figure 3 is a transverse axial section through the revolving drum.

Figure 4 is an enlarged plan view of a guide pocket for a tine, taken at line 4—4 on Figure 1.

Figure 5 is a fragmentary sectional view through the drum showing details of construction, and taken at line 5—5 on Figure 2.

Figure 6 is a fragmentary sectional view through the drum.

The present invention is adapted for use in connection with vehicles of various forms, and for purposes of illustration is herein shown associated with a trailing type of vehicle running gear having a main frame, 10, which is provided at its forward end with a pair of transversely spaced wheels, 11, and at its rear end with a single, centrally located small swivel or caster wheel, 12. Journaled on the main frame of the vehicle is a transversely extending revolving drum, 14, which, as herein shown, is of cylindrical form, and rigidly secured in the respective ends thereof are radial-armed header members, 15, which are fixedly secured on a horizontal, transversely extending drive shaft, 16, by means of keys, 17. This shaft, 16, which may be termed the drum shaft, projects laterally beyond the header members with its extreme end portions journaled in bearings, 18 and 18ª, the latter being formed integral with a vertically disposed cam track element, 19, disposed adjacent one end of the drum and fixedly mounted on the frame, 10.

The cylindrical portion of the drum is preferably made of sheet metal, and to facilitate manufacture it may be made up in a plurality of sections with their abutting edges formed with interlapping curved lugs, 20, which are adapted to be engaged by a common rod, 21, extending through the alternating lugs of said adjacent edges of the plates, forming a connection similar to a "piano hinge". Journaled in the header members, 15, are a plurality of circumferentially spaced longitudinally extending pivot shafts, 23, disposed parallel to said drum shaft, 16, within the drum. Axially spaced along each of these respective shafts are a plurality of tines, 25, whose inner ends are coiled about the shafts, 23, as seen at 26 on Figure 3, and then anchored to them, thus forming an individually yieldable connection of each tine to its shaft. These tines, as may be seen in Figure 1, of the drawings, are formed of rod stock with the curved material-engaging portion, 25, radially offset from and concentric with its pivot shaft; the curved portion, 25, of each tine ends at a sharp bend from which the rod continues as a radially extending arm, 27, which serves to connect curved portion to its pivot shaft. The drum surface is provided with apertures, 28, properly located for registration with the tines to permit the latter to be swung exteriorly of the drum into operative position, or telescoped into the drum. It will be manifest that by reason of the curved portions, 25, of the tines being concentric with the pivot axis, upon turning of the pivot shafts, the tines thereon will be swung so that the curved portions, 25, move in a true curvilinear path, into or out of operative position. By reason of this particular construction the apertures, 28, may be relatively small in size, just slightly greater than the cross sectional area of the curved portions of the tines.

All of said pivot shafts, 23, are dimensioned so as to extend laterally beyond the header member at the end adjacent the cam track, 19, and rigidly secured to these extended end portions of the pivot shafts are crank arms, 30, whose outer ends are provided with follower elements, which are herein shown as loosely journaled rollers, 32. The cam element, 19, which preferably is a casting, is formed with a cam track or groove, 33, within which said rollers cooperate. As may be seen in Figure 1 of the drawings the cam track, 33, is designed with a concentric portion, 33ª, constituting a major portion of an annulus, and the ends of which extend rearwardly and continue into a substantially vertically disposed track, 33ª, portion, 33ᵇ, which connects the ends of the concentric portion, 33ª, of the cam track.

It may be understood that the parts are so dimensioned that when the drum is revolved the rollers, 32, follow in the cam track, 33, and thereby control the movement of the tines through the respective pivot shafts. As long as the rollers traverse the concentric portion, 33ª, of the cam track, the tines will be maintained in projected operative position at which the curved portions, 25, extend oblique to the peripheral surface of the drum in a manner to conveniently pick up the straw or similar material from the ground as the drum is being rotated, and carry it upwardly and in a rearward direction. As each follower roller, 32, traverses the vertical portion of the cam track, 33ᵇ, the pivot shaft controlled by such roller is rocked so that the tines associated with the pivot shaft are swung inwardly and the extreme outer ends of the tines are retracted wholly within the drum as indicated at A, in Figure 1. The tines are held in such retracted position during the interval that the roller travels along the vertical track, 33ᵇ. When the same follower roller emerges from the lower end of the vertical cam track portion, 33ᵇ, and commences to traverse the concentric cam track portion, 33ª, the pivot shaft is rocked in the reverse direction so as to positively project the tines through the apertures, 28, into operative position. The extent of the concentric portion of the cam track may be designed to suit certain conditions so as to cause the tines to be retracted into the drum at a desired place relative to the axis of the drum, and remain therein for a certain portion of each revolution of the drum, and as herein shown the tines are caused to be retracted into the drum just prior to their approach to a platform indicated at B, which may be understood to be either a fixed platform or any suitable form of conveyor for continuously removing the material as it is picked up and discharged by said tines.

The particular motion imparted to the tines is of great advantage, in that it positively strips off all material engaged thereby and causes it to be discharged onto the platform, B, or other receiver.

In order to insure that the tines after retraction inside of the drum will emerge through their respective apertures, 28, I provide guide means including a member of U-shaped cross section having two spaced apart skirts or sides, 37, positioned in registration with opposite sides of an aperture, and between which skirt portions, 37, said tines are adapted to be arrested at the limit of their inward movement.

It may be understood that any suitable power source may be provided for rotating the drum and, as herein shown, the drum is given its rotary motion by the tractive effort of one of the wheels, 11. For illustrative purposes, in this construction I have shown a pinion, 39, rigidly associated with said wheel and meshing with a second pinion, 40, which is journaled on a stud, 41, carried by the frame, and to the opposite end of which stud a sprocket wheel, 42, is rigidly secured. Trained around said sprocket wheel, 42, is a flexible chain belt, 43, which engages a second sprocket wheel, 44, fixed on the outer end of the drum shaft, 16. This type of drive may be provided from the other wheel, 11, if desired, with suitable equalizing or differential connections as readily understood by those skilled in this art.

I claim:

1. In a machine of the character described, the combination of a support, a drum rotatably mounted on the support, means for rotating the drum, a plurality of axially spaced tines pivotally mounted in the drum and having material-engaging portions normally projecting exteriorly of the drum surface in operative position, and means responsive to the rotation of the drum for withdrawing said tines wholly into the drum when they arrive at a predetermined angular position, for stripping off the material carried thereby and individual guiding means for each of said tines for directing their return movement to projecting position.

2. In a machine of the character described, the combination of a support, a drum rotatably mounted on said support, means for rotating the drum, a plurality of axially spaced tines pivotally mounted inside the drum, and having curved material-engaging portions offset radially relative to their pivot axes, with the curved portions normally extending outwardly through apertures in the drum in operative position, means responsive to the rotation of the drum at certain predetermined periods for swinging the tines about their pivots so as to be disposed wholly within the drum, and means within the drum adjacent each of said apertures for guiding the tines and insuring registration of said curved portions thereof with their respective apertures.

3. In a machine of the character described, the combination of a support, a drum rotatably mounted on the support, means for rotating the drum, a plurality of axially spaced tines pivotally mounted in the drum and having material-engaging portions normally projecting through slots in the drum surface in operative position, means responsive to the rotation of the drum for withdrawing said tines wholly into the drum when they arrive at a predetermined angular position, for stripping off the material carried by the tines, and guiding means for the tines comprising lateral skirt portions extending inside the drum in spaced relation at opposite sides of each slot with connecting means joining each pair of skirt portions within the drum.

4. In a machine of the character described, the combination of a support, an apertured drum rotatably mounted on the support, means for rotating the drum, a plurality of axially spaced spring tines, one or more rock shafts on which said tines are mounted within the drum, each tine including a raking portion curved approximately about the axis of its rock shaft, and a supporting arm integral with the raking portion bent to extend transversely therefrom toward the rock shaft and coiled about said shaft with its end anchored thereto, whereby the curved raking portion is adapted to yield with respect to said supporting arm and said arm may yield by swinging about the axis of the rock shaft through a limited arc, said curved raking portions normally projecting through the apertures in the drum in operative position, means responsive to the rotation of the drum for rocking the tine-supporting shaft or shafts to withdraw the raking portions of said tines wholly into the drum for stripping off material carried thereby, and individual guiding means within the drum for each of said tines to direct their return movement through the apertures to projecting position.

HARLAN E. TINSLEY.